US012217493B2

(12) United States Patent
Fumagalli et al.

(10) Patent No.: US 12,217,493 B2
(45) Date of Patent: Feb. 4, 2025

(54) METHODS, SYSTEMS, AND MEDIA FOR GENERATING VIDEO CLASSIFICATIONS USING MULTIMODAL VIDEO ANALYSIS

(71) Applicant: Integral Ad Science, Inc., New York, NY (US)

(72) Inventors: Mattia Fumagalli, Brooklyn, NY (US); Stefano Vegnaduzzo, Ann Arbor, MI (US); Charlie Schumacher, New York, NY (US); Varun Medappa, New York, NY (US); Tyler Hughes, New York, NY (US); Aleks Navratil, New York, NY (US); Josh Ryan, New York, NY (US); Igor Benyaminov, Forest Hills, NY (US)

(73) Assignee: Integral Ad Science, Inc., New York, NY (US)

( * ) Notice: Subject to any disclaimer, the term of this patent is extended or adjusted under 35 U.S.C. 154(b) by 345 days.

(21) Appl. No.: 17/890,112

(22) Filed: Aug. 17, 2022

(65) Prior Publication Data

US 2023/0054330 A1 Feb. 23, 2023

Related U.S. Application Data

(60) Provisional application No. 63/234,209, filed on Aug. 17, 2021.

(51) Int. Cl.
*G06V 20/40* (2022.01)
*G06Q 30/0241* (2023.01)
(Continued)

(52) U.S. Cl.
CPC ....... *G06V 10/811* (2022.01); *G06Q 30/0276* (2013.01); *G06V 10/82* (2022.01);
(Continued)

(58) Field of Classification Search
CPC .. G06Q 30/0276; G06V 10/811; G06V 10/82; G06V 20/41; G06V 20/48;
(Continued)

(56) References Cited

U.S. PATENT DOCUMENTS

2021/0329338 A1* 10/2021 Khov .................... G06N 3/045
2022/0237892 A1* 7/2022 Anderton-Yang ... G06V 10/764

FOREIGN PATENT DOCUMENTS

| CN | 105389558 A | * | 3/2016 | ......... G06K 9/00718 |
| CN | 108419091 A | * | 8/2018 | ............ G06N 20/00 |
| KR | 102115178 B1 | * | 5/2020 | |

* cited by examiner

*Primary Examiner* — Carol Wang
(74) *Attorney, Agent, or Firm* — Byrne Poh LLP

(57) ABSTRACT

Methods, systems, and media for generating video classifications using multimodal video analysis are provided. In some embodiments, a method for classifying videos comprising: receiving, from a computing device, a video identifier; parsing a video associated with the video identifier into an audio portion and a plurality of image frames; analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class; concurrently with analyzing the plurality of image frames associated with the video, analyzing the audio portion of the video using an automated speech recognition technique to obtain second textual information corresponding to words spoken in the video; combining the first textual information, the probability of each of the plurality of objects appearing in the at least one of the plurality of frames of the video, and (Continued)

the second textual information to obtain a combined analysis output for the video; determining, using a neural network, a safety score for each of a plurality of categories that the video contains content belonging to a category of the plurality of categories, wherein the combined analysis output is input into the neural network; and, in response to receiving the video identifier, transmitting a plurality of safety scores corresponding to the plurality of categories to the computing device for the video associated with the video identifier.

21 Claims, 6 Drawing Sheets

(51) Int. Cl.
*G06V 10/80* (2022.01)
*G06V 10/82* (2022.01)
*G06V 30/19* (2022.01)
*G10L 15/26* (2006.01)

(52) U.S. Cl.
CPC .............. *G06V 20/41* (2022.01); *G06V 20/48* (2022.01); *G06V 30/191* (2022.01); *G10L 15/26* (2013.01)

(58) Field of Classification Search
CPC ...... G06V 20/62; G06V 30/191; G10L 15/26; G06F 40/20
See application file for complete search history.

METHODS, SYSTEMS, AND MEDIA FOR GENERATING VIDEO CLASSIFICATIONS USING MULTIMODAL VIDEO ANALYSIS

CROSS-REFERENCE TO RELATED APPLICATIONS

This application claims the benefit of U.S. Provisional Patent Application No. 63/234,209, filed Aug. 17, 2021, which is hereby incorporated by reference herein in its entirety.

TECHNICAL FIELD

The disclosed subject matter relates to classifying video content based on multiple modes of analysis. More particularly, the disclosed subject matter relates to classifying a video as being safe or unsafe for advertisers to place one or more advertisements in connection with the video using information from video frames, audio content, and textual data associated with the video.

BACKGROUND

Advertisers often choose where and how to deploy advertisements based on the relevance of the advertisement to a target audience. In online advertising marketplaces, advertisers are often disconnected from the exact content (e.g., webpage, video, social media posts, etc.) which appear in the same context as the advertisement. Brand safety is therefore a frequent concern for these advertisers.

The emergence of social media networks and platforms centered around video sharing and editing (e.g., Instagram, Snapchat, TikTok, Twitch, etc.) highlights the need for a brand safety solution that performs video analysis across content from diverse sources. Current video classification approaches, however, tend to rely on frame-by-frame image analysis of the shared video alone, while neglecting other aspects of the video.

Accordingly, it is desirable to provide methods, systems, and media that overcome these and other deficiencies in the prior art.

SUMMARY

Methods, systems, and media for generating video classifications using multimodal video analysis are provided.

In accordance with some embodiments of the disclosed subject matter, a method for classifying videos is provided, the method comprising: receiving, from a computing device, a video identifier; parsing a video associated with the video identifier into an audio portion and a plurality of image frames; analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class; concurrently with analyzing the plurality of image frames associated with the video, analyzing the audio portion of the video using an automated speech recognition technique to obtain second textual information corresponding to words spoken in the video; combining the first textual information, the probability of each of the plurality of objects appearing in the at least one of the plurality of frames of the video, and the second textual information to obtain a combined analysis output for the video; determining, using a neural network, a safety score for each of a plurality of categories that the video contains content belonging to a category of the plurality of categories, wherein the combined analysis output is input into the neural network; and, in response to receiving the video identifier, transmitting a plurality of safety scores corresponding to the plurality of categories to the computing device for the video associated with the video identifier.

In some embodiments, the method further comprises: determining a threshold for each category in the plurality of categories; and comparing, for each of the plurality of categories, the safety score that the video contains content belonging to the category of the plurality of categories against the threshold for that category.

In some embodiments, the method further comprises: associating categories with the video based on the comparison of the safety score and the threshold for each of the plurality of safety categories; and transmitting the associated categories to the computing device for the video associated with the video identifier.

In some embodiments, the threshold for each category in the plurality of categories is determined based on a set labeled data that is applied to the neural network.

In some embodiments, the method further comprises determining whether one or more advertisements associated with the computing device should be placed in connection with the video associated with the video identifier based on the safety score for each of the plurality of categories.

In some embodiments, the method further comprises determining a number of advertisements served in connection with a plurality of videos that are deemed to be unsafe based on the safety score for each of the plurality of categories corresponding to that video.

In some embodiments, the plurality of categories includes categories that are considered unsafe in association with one or more advertisements by an advertiser.

In some embodiments, the video is generated by a user on a social media platform.

In some embodiments, the audio portion of the video is further analyzed using an audio tagging classifier to detect sounds occurring within the audio portion of the video and wherein the detected sounds are incorporated into the combined analysis output for the video.

In some embodiments, the plurality of images frames are further analyzed using an object detector to detect objects appearing in at least one of the plurality of images and wherein the detected objects are incorporated into the combined analysis output for the video.

In accordance with some embodiments of the disclosed subject matter, a system for classifying videos is provided, the system comprising a server that includes a hardware processor, wherein the hardware processor is configured to: receive, from a computing device, a video identifier; parse a video associated with the video identifier into an audio portion and a plurality of image frames; analyze the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class; concurrently with analyzing the plurality of image frames associated with the video, analyze the audio portion of the video using an automated speech recognition technique to obtain second textual information corresponding to words spoken in the video; combine the first textual information, the probability of each of the plurality of objects appearing in the at least one of the plurality of frames of the video, and the second textual information to obtain a combined analysis output for the video; determine, using a neural network, a safety score for each of a plurality of categories that the video contains content belonging to a category of the plurality of categories, wherein the combined analysis output is input into the neural network; and, in response to receiving the video identifier, transmit a plurality of safety scores corresponding to the plurality of categories to the computing device for the video associated with the video identifier.

In accordance with some embodiments of the disclosed subject matter, a non-transitory computer-readable medium containing computer executable instructions that, when executed by a processor, cause the processor to perform a method for classifying videos is provided, the method comprising: receiving, from a computing device, a video identifier; parsing a video associated with the video identifier into an audio portion and a plurality of image frames; analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class; concurrently with analyzing the plurality of image frames associated with the video, analyzing the audio portion of the video using an automated speech recognition technique to obtain second textual information corresponding to words spoken in the video; combining the first textual information, the probability of each of the plurality of objects appearing in the at least one of the plurality of frames of the video, and the second textual information to obtain a combined analysis output for the video; determining, using a neural network, a safety score for each of a plurality of categories that the video contains content belonging to a category of the plurality of categories, wherein the combined analysis output is input into the neural network; and, in response to receiving the video identifier, transmitting a plurality of safety scores corresponding to the plurality of categories to the computing device for the video associated with the video identifier.

In accordance with some embodiments of the disclosed subject matter, a system for classifying videos is provided, the method comprising: means for receiving, from a computing device, a video identifier; means for parsing a video associated with the video identifier into an audio portion and a plurality of image frames; means for analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class; means for analyzing the audio portion of the video using an automated speech recognition technique to obtain second textual information corresponding to words spoken in the video concurrently with analyzing the plurality of image frames associated with the video; means for combining the first textual information, the probability of each of the plurality of objects appearing in the at least one of the plurality of frames of the video, and the second textual information to obtain a combined analysis output for the video; means for determining, using a neural network, a safety score for each of a plurality of categories that the video contains content belonging to a category of the plurality of categories, wherein the combined analysis output is input into the neural network; and means for transmitting a plurality of safety scores corresponding to the plurality of categories to the computing device for the video associated with the video identifier in response to receiving the video identifier.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
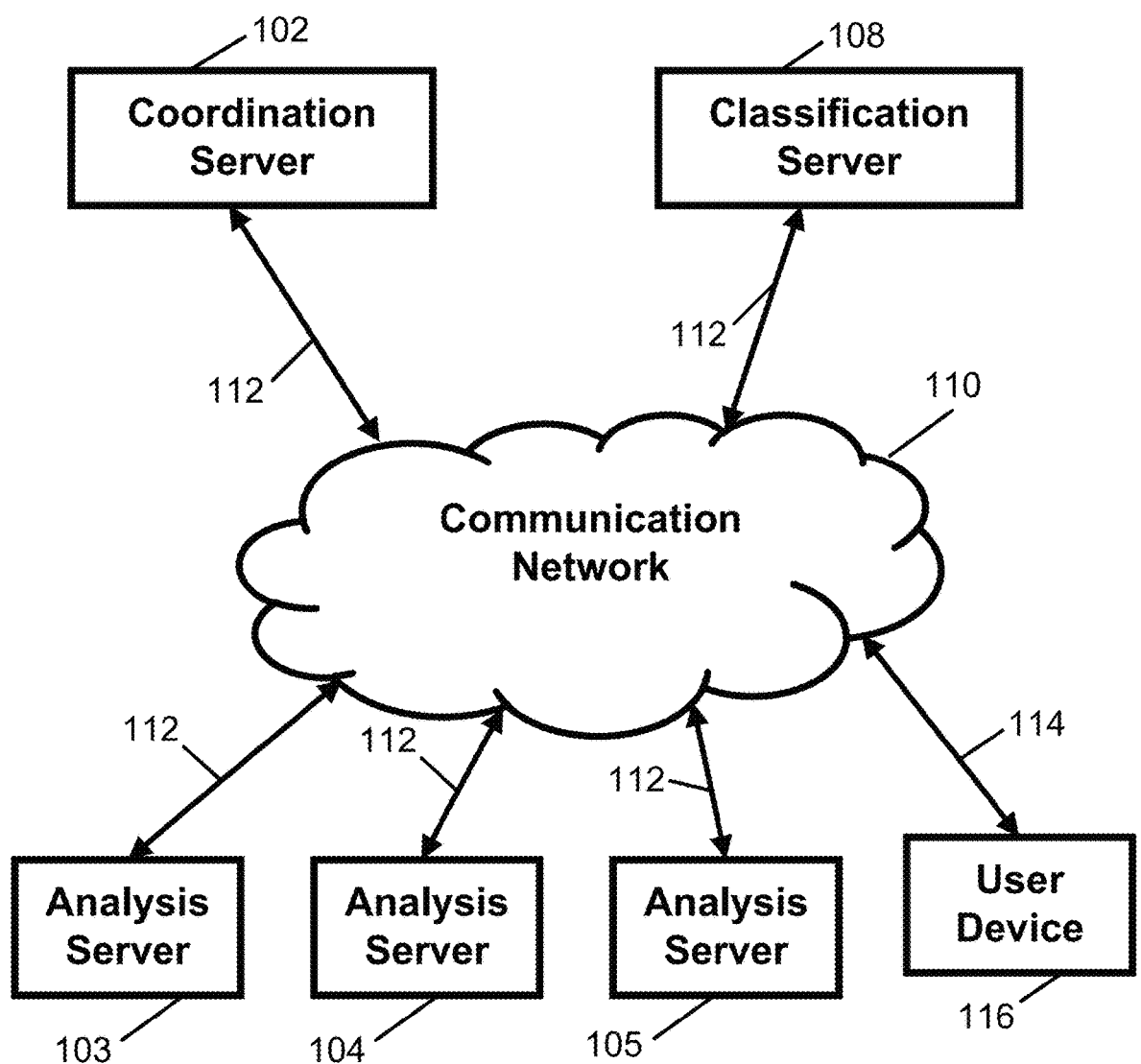
FIG. 1 shows a schematic diagram of an example of a system for generating video classifications in accordance with some embodiments of the disclosed subject matter.
Figure 2:
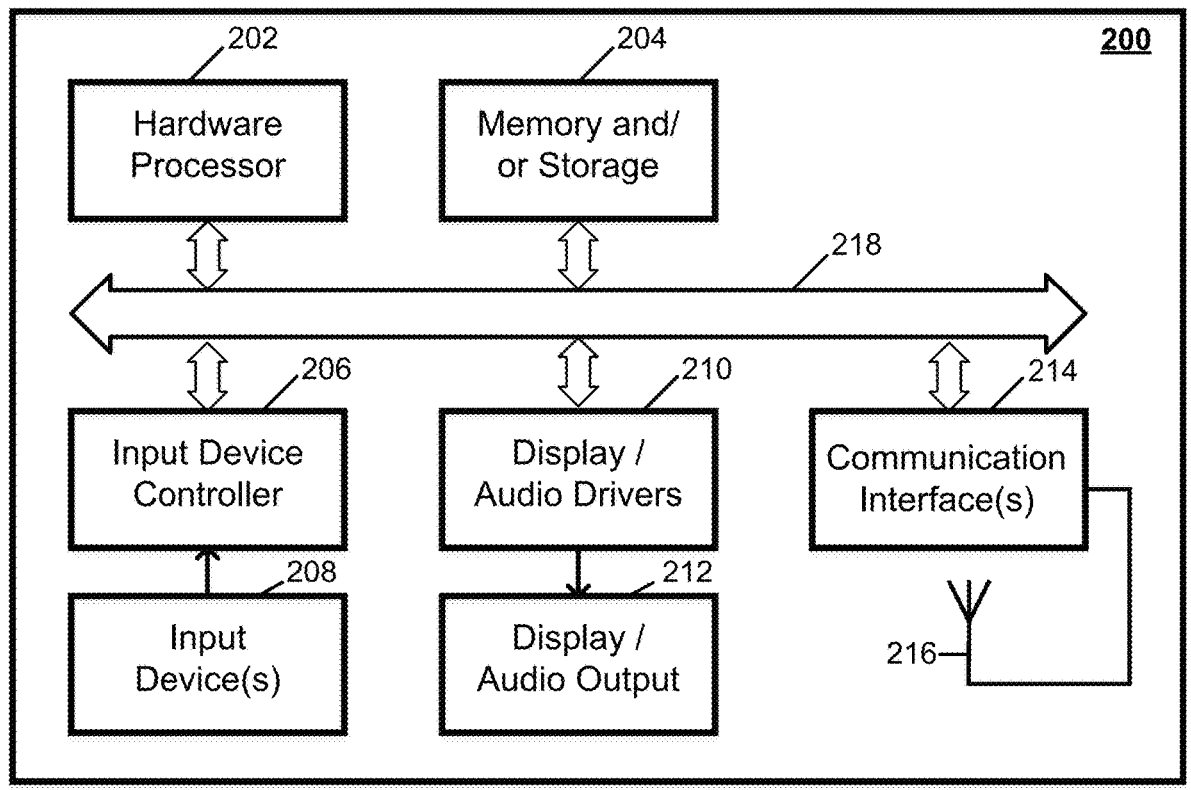
FIG. 2 shows an illustrative example of hardware that can be used in a server of FIG. 1 in accordance with some embodiments of the disclosed subject matter.

In accordance with some embodiments of the disclosed subject matter, mechanisms (which can include methods, systems, and media) for generating video classifications using multimodal video analysis are provided. More particularly, the disclosed subject matter relates to classifying videos as being safe or unsafe for advertisers using information from video frames, audio, and textual data.

In some embodiments, the mechanisms include receiving a video identifier associated with a video content item. For example, the video identifier can be associated with a video being presented on a computing device (e.g., a video shared on a social media application). In another example, the video identifier can be associated with a video that has been uploaded to a social media service.

In some embodiments, the mechanisms can parse and/or otherwise extract an audio portion and a plurality of image frames from the video corresponding to the video identifier. For example, the mechanisms can include one or more base models that analyze the video in parallel. In a more particular example, the mechanisms can include (i) an optical character recognition model that obtains text information corresponding to text appearing in at least one of the image frames, (ii) an image classification model that obtains, for each object appearing in at least one of the image frames, a probability that an object appearing in the image frame falls within a particular image class. In another more particular example, the mechanisms can include an automated speech recognition model that obtains text information corresponding to words that are being spoken in the video.

It should be noted, however, that the mechanism can contain any suitable model and can incorporate any suitable additional models. For example, in some embodiments, an audio tagging model can be used to analyze the audio portion of the video to detect one or more sounds appearing in at least one of the image frames.

In some embodiments, the mechanisms can combine the information obtained from the models applied to the audio portion and image frames extracted from the video to generate a combined analysis output for the video.

In some embodiments, the mechanisms can input the combined analysis output for the video into a trained multimodal neural network that determines a safety score for each of multiple categories that the video contains content belonging to a category of the plurality of categories. For example, a safety score can be generated by the trained multimodal neural network for each of eleven categories including (1) adult and explicit sexual content, (2) arms and ammunition, (3) crime and harmful acts to individuals and society, (4) death and injury, (5) online piracy, (6) hate speech and acts of aggression, (7) obscenity and profanity, (8) illegal drugs/tobacco/e-cigarettes/vaping/alcohol, (9) spam or harmful content, (10) terrorism, and (11) debated sensitive social issues. In a more particular example, the safety score can be a binary classification as to whether the video contains or does not contain content falling within one of the eleven categories.

It should be noted that the multimodal neural network can be trained in any suitable manner. For example, the multimodal neural network can be trained on video examples that have been classified as being unsafe in one or more categories. In another example, the multimodal neural network can be trained on video examples that have been classified as being unsafe in one or more categories and video examples that have been classified as being safe in one or more categories. In yet another example, the multimodal neural network can be trained on video examples selected by an advertiser as being unsafe for the advertiser's brand.

These mechanisms can be used in a variety of applications. For example, an advertiser can receive these safety scores and/or binary classifications to determine whether a particular video meets safety requirements. In continuing this example, the advertiser can determine whether to place an advertisement in connection with the video (e.g., a pre-roll advertisement, a mid-roll advertisement, or a post-roll advertisement). Additionally or alternatively, the mechanisms can provide the advertiser with an indication as to how many advertisements have been placed with a video that is deemed to be unsafe or otherwise unsuitable for a brand associated with the advertiser.

These and other features for generating video classifications using multimodal video analysis are described further in connection with FIGS. 1-6B.

Turning to FIG. 1, an illustrative example of a system 100 for generating video classifications using multimodal video analysis in accordance with some embodiments is shown. As illustrated, system 100 can include a coordination server 102, analysis servers 103, 104, and 105, a classification server 108, a communication network 110, and one or more user devices 116.

Figure 6A:
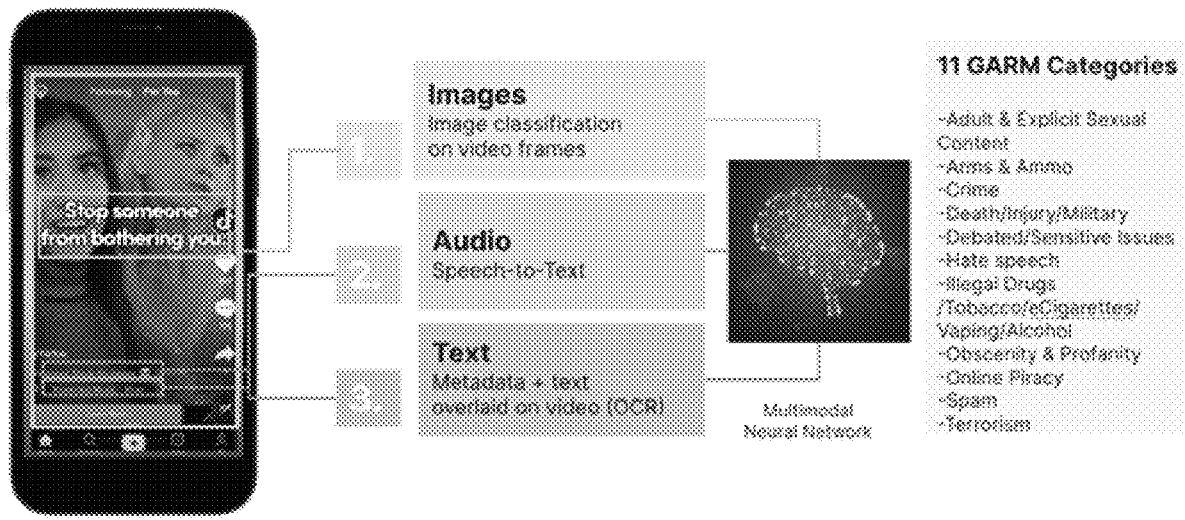
FIGS. 6A and 6B show illustrative examples of a generated video classification from image data, audio data, and text data extracted from a video being presented on a computing device in accordance with some embodiments of the disclosed subject matter.
Figure 6B:
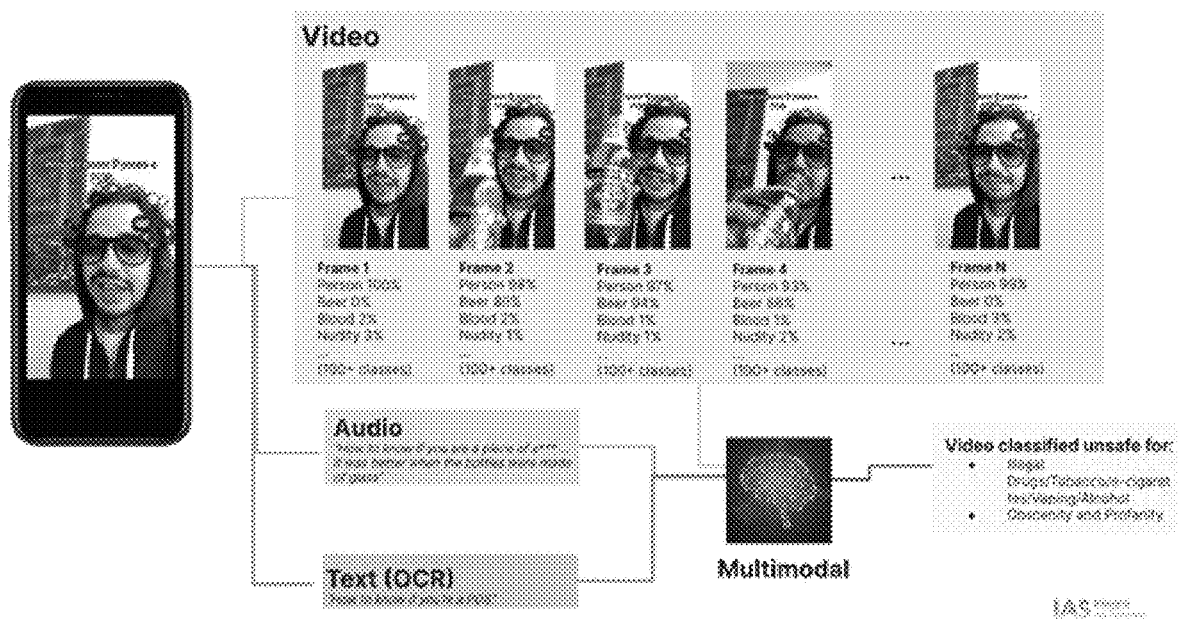

Coordination server 102 can be any suitable server(s) for storing information, data, programs, media content, and/or any other suitable content. In some embodiments, server 102 can perform any suitable function(s). In some embodiments, coordination server 102 can send and receive messages using communication network 110. For example, in some embodiments, coordination server 102 can combine analysis outputs from analysis servers 103, 104, and 105 and/or any other suitable analysis servers into a combined analysis record associated with an input video for transmission to classification server 108. In a more particular example, as shown in FIGS. 6A and 6B, in response to inputting a video having multiple image frames into analysis server 104 for performing automated speech recognition, analysis server 104 for performing automated speech recognition, and analysis server 105 for performing image classification, coordination server 102 can combine the outputs from each analysis server and transmit the combined analysis information to a multimodal neural network executing on classification server 108 for classifying the content of the video into each of eleven Global Alliance for Responsible Media (GARM) categories and for indication which GARM categories that the video may be deemed unsafe for providing content, such as an advertisement.

Analysis servers 103, 104, and 105 can be any suitable servers for storing information, data, programs, media content, and/or any other suitable content. In some embodiments, analysis servers 103, 104, and 105 can send and receive messages using communication network 110.

In some embodiments, analysis servers 103, 104, and 105 can each be configured to run and/or train a machine learning model (e.g., neural networks, decision trees, classification techniques, Bayesian statistics, and/or any other suitable technique) to perform image and/or audio analysis techniques.

For example, in some embodiments, analysis server 103 can be configured to run and/or train a machine learning model to perform optical character recognition (OCR). In this example, in some embodiments, analysis server 103 can train a machine learning model on a dataset such as images from social media which contain metadata and/or text overlaid on video frames. Continuing this example, in some embodiments, analysis server 103 can additionally run a trained machine learning model to output a transcript of metadata and/or text overlaid on a video frame when given a video outside of the training dataset as input. For example, as shown in FIG. 6B, in response to inputting a video having multiple image frames into analysis server 103 for performing automated speech recognition, analysis server 103 can output a transcript of text that appears within the image frames of the video (e.g., "How to know if you're a POS").

In another example, in some embodiments, analysis server 104 can be configured to run and/or train a machine learning model to perform automated speech recognition (ASR). In this example, in some embodiments, analysis server 104 can train a machine learning model on a dataset containing speech in any suitable language. Continuing this example, in some embodiments, analysis server 104 can additionally run a trained machine learning model to output a transcript of an audio record when given a video and/or audio track outside of the training dataset as an input. In another example, in some embodiments, analysis server 104 can be configured to run and/or train a machine learning model to tag an audio track. In this example, in some embodiments, analysis server 104 can train a machine learning model to recognize sounds relevant for advertising brand safety (e.g., explosions, gunshots). Continuing this example, in some embodiments, analysis server 104 can additionally run a trained machine learning model to output a record of audio tags identified in an audio track when given a video and/or audio track outside of the training dataset as input. For example, as shown in FIG. 6B, in response to inputting a video having multiple image frames and an audio portion into analysis server 104 for performing automated speech recognition, analysis server 104 can output a transcript of the audio portion spoken in each of the image frames of the video (e.g., "How to know if you are a piece of s*** . . . it was better when the bottles were made of glass").

In another example, in some embodiments, analysis server 105 can be configured to run and/or train a machine learning model to perform image classification. In this example, in some embodiments, analysis server 105 can train a machine learning model to classify images across any suitable number of categories. In particular, in some embodiments, analysis server 105 can train a machine learning model to classify images across 100 or more categories relevant for advertising brand safety (e.g., alcohol, drugs, nudity, extremist symbols). In some embodiments, given an image input to a trained machine learning model, analysis server 105 can output a probability for each category corresponding to the likelihood that the input image can be classified into each of the categories used to train the machine learning model. For example, as shown in FIG. 6B, in response to inputting a video having multiple image frames into analysis server 105 for performing image classification, analysis server 105 can extract multiple frames from the video (e.g., each frame, a frame every five seconds, etc.) and output a probability, for each image class, as to whether an object appears within the image frame (e.g., "Person 100%," "Beer 0%," "Blood 2%," "Nudity 2%," etc.). It should be noted that, as shown in FIG. 6B, the image classes having a higher probability can be ranked at the top of the list of image class probabilities for the video.

In another example, in some embodiments, analysis server 105 (or any other suitable analysis server) can be configured to run and/or train a machine learning model to perform object detection. In this example, in some embodiments, analysis server 105 can train a machine learning model to detect objects within an image. Continuing this example, in some embodiments, analysis server 105 can additionally run a trained machine learning model to output a record of objects detected when given an image outside of the training dataset as input.

It should be noted that, although the embodiments described herein include analysis server 103 for performing optical character recognition, analysis server 104 for performing automated speech recognition, and analysis server 105 for image classification, this is merely illustrative and any suitable number of analysis servers can be used. For example, a single analysis server can, in parallel, perform optical character recognition of text appearing in a video, automated speech recognition to detect words being spoken in the video, and image classification to detect objects appearing in the video. In another example, an analysis server can perform analyses on the image frames of the video, such as optical character recognition and image classification, and another analysis server can perform analyses on the audio portion of the video, such as automated speech recognition and audio tagging. In yet another example, additional analysis servers or additional models can be incorporated into system 100, such as an analysis server for audio tagging that recognizes sounds occurring in the video (e.g., explosions or gunshots).

Classification server 108 can be any suitable server for storing information, data, programs, media content, and/or any other suitable content in some embodiments. In some embodiments, classification server 108 can send and receive messages using communication network 110. For example, in some embodiments, classification server 108 can receive analysis results from coordination server 102 through communication links 112.

In some embodiments, classification server 108 can run and/or train a multimodal classification machine learning model. For example, classification server 108 can include a combination of convolutional neural networks and text vectorizers. In a more particular example, the multimodal classifier can be a neural network that receives multiple inputs such as at least one of transcripts or text information from an optical character recognition model that detects text appearing within image frames of the video, transcripts or text information from an automated speech recognition model that detects speech spoken in an audio portion of the video, text based image descriptions generated by social media users, a list of probabilities generated by a pretrained image classifier that images within the image frames of the video fall within particular image classes, a list of audio tags, and/or a list of objects detected in the image frames of the video. In continuing this example, the neural network can process OCR transcripts using tokenization and word embedding. Additionally, in some embodiments, the neural network can process ASR transcripts using tokenization and word embedding. Additionally, in some embodiments, the neural network can process any other suitable text using tokenization and term-frequency inverse-document-frequency weighting. For example, video descriptions can be processed by tokenization and term-frequency inverse-document-frequency (TFIDF) weighting, where the TFIDF values can then be submitted to a fully connected layer. In some embodiments, classification server 108 can process image classifier predictions in a one-dimensional convolutional layer. For example, image classifier predictions can be padded to a standard length, and then submitted to a one-dimensional convolutional layer. Across all image predictions, the multimodal neural network can then select the maximum value of each dimension of the convolutional output.

In continuing this example, the classification head of the multimodal neural network begins by concatenating the final outputs of the ASR, OCR, description, and image classifier components. The output of this concatenation can then be successively processed by several alternating dropout and fully connected layers. A final fully connected classification layer can then compute the probability of the input video containing each binary GARM category.

In some embodiments, classification server 108 can store and/or access training data for use with the multimodal classification machine learning model. In some embodiments, the training data can include media content item(s) with audio track(s), video track(s), video description(s), text overlay on video frame(s), and/or any other suitable features. In some embodiments, the training data can include labels indicating a category, classification and/or any other suitable identifier to the audio track, video track, video description, text overlay, and/or any other suitable media content feature. In some embodiments, classification server 108 can use any suitable amount of training data to train the multimodal classification machine learning model. In some embodiments, classification server 108 can use a portion of available data to train the multimodal classification machine learning model.

Communication network 110 can be any suitable combination of one or more wired and/or wireless networks in some embodiments. For example, in some embodiments, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, user devices 116 can be connected by one or more communications links (e.g., communications links 114) to communication network 110 that can be linked via one or more communications links (e.g., communications links 112) to coordination server 102. The communications links can, in some embodiments, be any communications links suitable for communicating data among user devices 116 and coordination server 102 such as network links, dial-up links, wireless links, hard-wired links, any other suitable communications links, or any suitable combination of such links.

Servers 102, 103, 104, 105, and 108 can be implemented using any suitable hardware in some embodiments. For example, in some embodiments, coordination server 102 can be implemented using any suitable general-purpose computer or special-purpose computer and can include any suitable hardware. For example, in some embodiments, as illustrated in example hardware 200 of FIG. 2, such hardware can include hardware processor 202, memory and/or storage 404, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 202 can be controlled by a computer program stored in memory and/or storage 204. For example, in some embodiments, the computer program can cause hardware processor 202 to perform functions described herein.

Memory and/or storage 204 can be any suitable memory and/or storage for storing programs, data, documents, and/or any other suitable information in some embodiments. For example, memory and/or storage 204 can include random access memory, read-only memory, flash memory, hard disk storage, optical media, and/or any other suitable memory in some embodiments.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device in some embodiments.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices in some embodiments.

Communication interface(s) 214 can, in some embodiments, be any suitable circuitry for interfacing with one or more communication networks, such as network 112 as shown in FIG. 1. For example, interface(s) 214 can include network interface card circuitry, wireless communication circuitry, and/or any other suitable type of communication network circuitry in some embodiments.

Antenna 216 can be any suitable one or more antennas for wirelessly communicating with a communication network (e.g., communication network 112) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
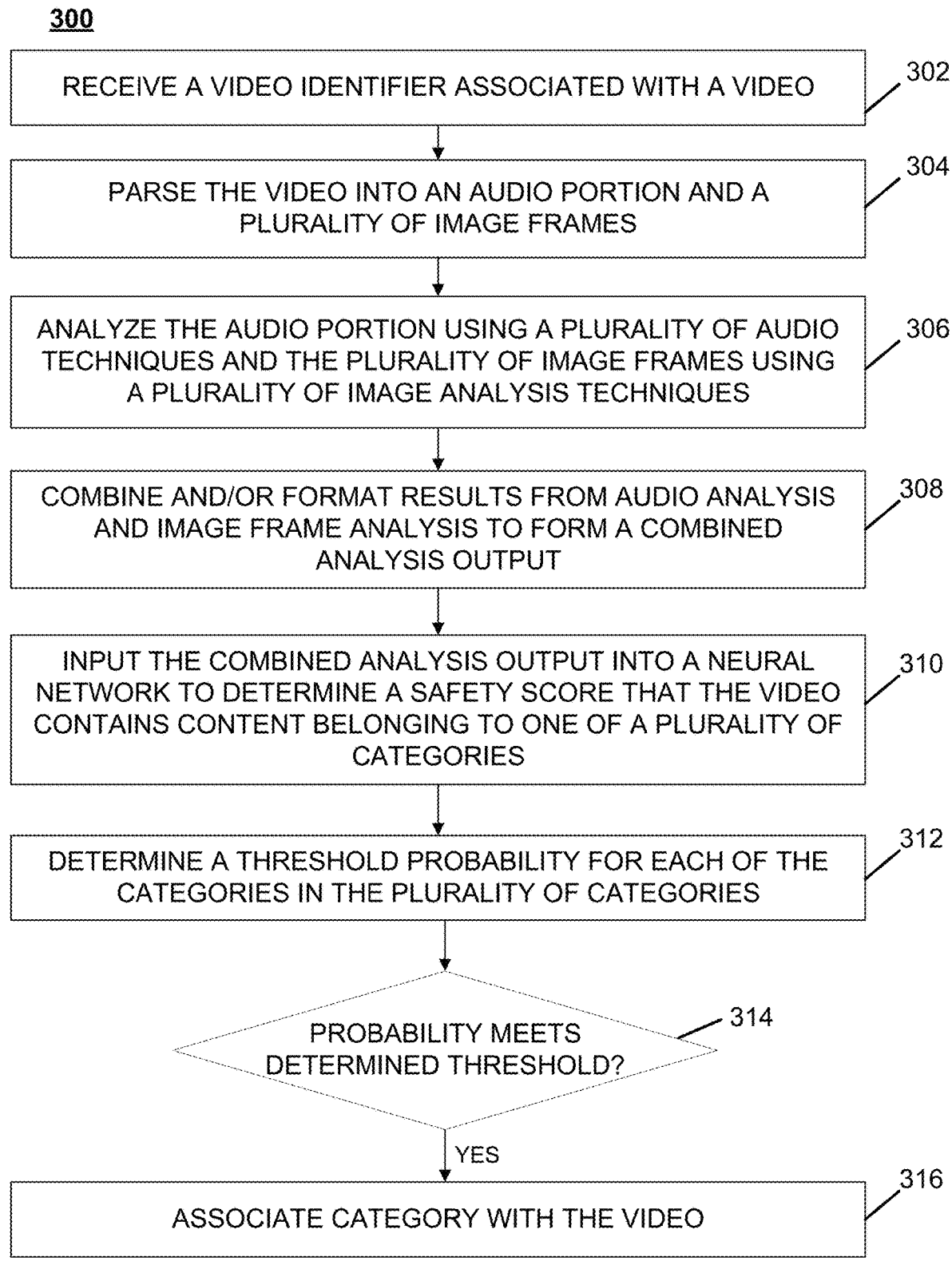
FIG. 3 shows an illustrative example of a process for generating video classifications using multimodal video analysis in accordance with some embodiments of the disclosed subject matter.

Turning to FIG. 3, an illustrative example of a process 300 for generating video classifications in accordance with some embodiments is shown. In some embodiments, process 300 can be wholly or partially performed by coordination server 102, analysis servers 103, 104, and 105, and/or classification server 108.

Figure 5:
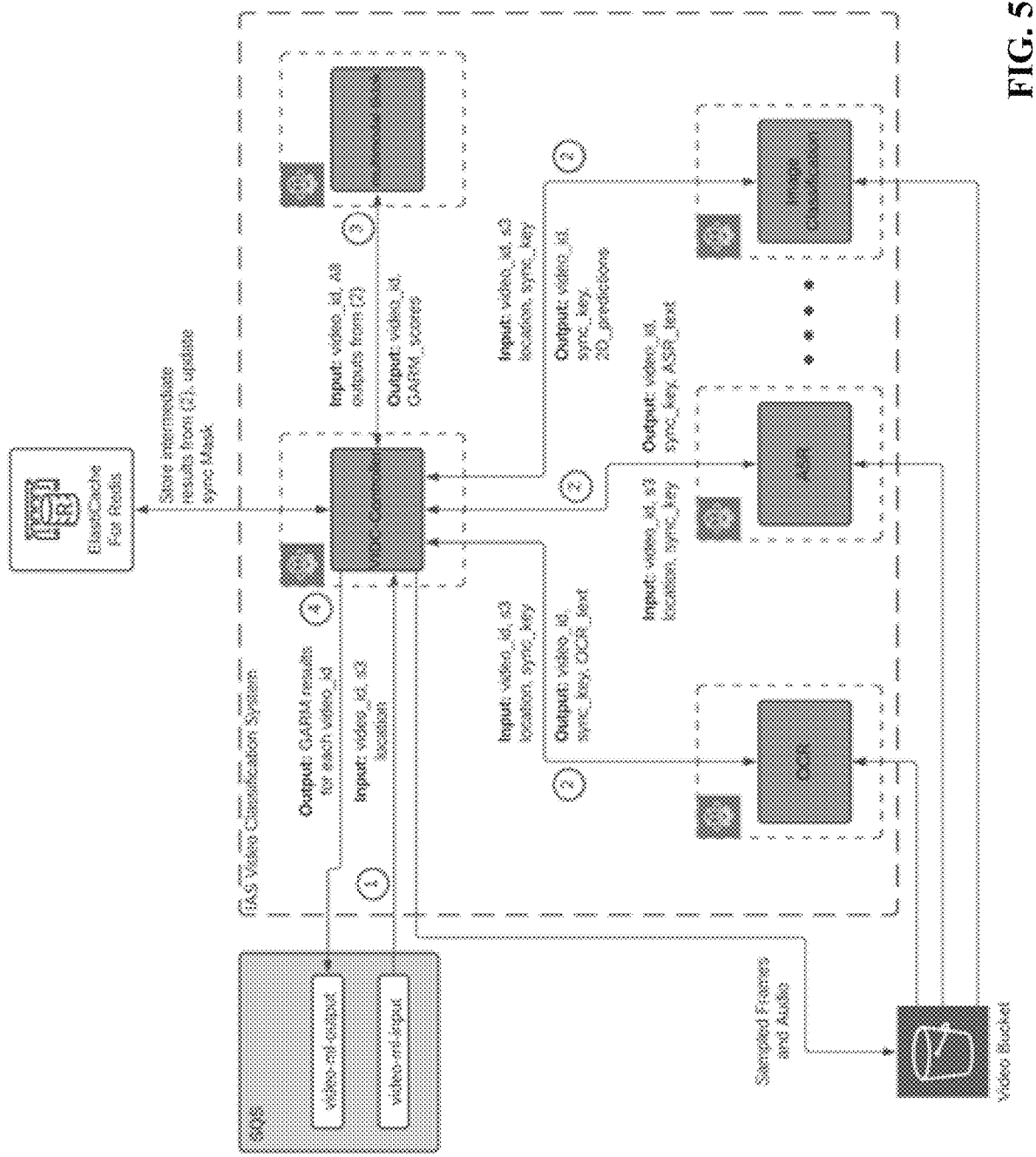
FIG. 5 shows a more particular example of an information flow diagram for generating video classifications in accordance with some embodiments of the disclosed subject matter.

In some embodiments, process 300 can begin in any suitable manner. In some embodiments, process 300 can begin when coordination server 102 receives a request from user device 116 for analysis of one or more video(s). For example, as shown in FIG. 5, process 300 can begin when a video classification system receives a video identifier from a computing device (e.g., a computing device associated with an advertiser).

At 302, process 300 can receive a video in some embodiments. In some embodiments, process 300 can receive the video in any suitable manner. For example, process 300 can receive a media file, a video identification label, and/or a storage location corresponding to a media file in some embodiments. In some embodiments, the video received at 302 can be a video generated on a social media site, one or more short video clips uploaded by a user to a social media and/or video sharing site, and/or any other suitable video.

At 304, process 300 can parse the video received at 302 into an audio portion and multiple image frames corresponding to the frames of the video in some embodiments. For example, process 300 can extract the entire audio portion of the video for analysis and can extract a particular number of image frames from the video (e.g., a video frame that occurs at every 1 second, every frame of a video uploaded at a frame rate of 30 frames per second, etc.).

At 306, process 300 can analyze the audio portion and the image frames using at least one of a plurality of audio and/or image analysis techniques in some embodiments. For example, in some embodiments, analysis server 103 can analyze the series of images using OCR, image classification, object detection, and/or any other suitable technique. In some embodiments, analysis server 104 can analyze the audio track using ASR, audio tagging, and/or any other suitable technique. In a more particular example, analysis server 103 can be configured to run and/or train a machine learning model to perform optical character recognition (OCR) on the extracted image frames. As shown in FIG. 6B, in response to inputting a video having multiple image frames into analysis server 103 for performing automated speech recognition, analysis server 104 can output a transcript of text that appears within the image frames of the video (e.g., "How to know if you're a POS"). In continuing this example, analysis server 104 can, in parallel with analysis server 103, be configured to run and/or train a machine learning model to perform automated speech recognition (ASR). As shown in FIG. 6B, in response to inputting a video having multiple image frames and an audio portion into analysis server 104 for performing automated speech recognition, analysis server 104 can output a transcript of the audio portion spoken in each of the image frames of the video (e.g., "How to know if you are a piece of s*** . . . it was better when the bottles were made of glass"). In continuing this example, analysis server 105 can, in parallel with analysis server 103 and/or analysis server 104, analysis server 105 can be configured to run and/or train a machine learning model to perform image classification. As shown in FIG. 6B, in response to inputting a video having multiple image frames into analysis server 105 for performing image classification, analysis server 105 can extract multiple frames from the video (e.g., each frame, a frame every five seconds, etc.) and output a probability, for each image class, as to whether an object appears within the image frame (e.g., "Person 100%," "Beer 0%," "Blood 2%," "Nudity 2%," etc.).

In some embodiments, each analysis technique used at 306 can be implemented with a machine learning model, as described above in FIG. 1 in connection with analysis servers 103, 104, and 105. In some embodiments, any suitable number and/or combination of analysis techniques can be used at 306. In some embodiments, process 300 can use or can abstain from the use of any analysis technique (e.g., OCR) without affecting the results from any other analysis technique (e.g., image classification).

In some embodiments, at 306, each analysis technique can produce an output as described in connection with analysis servers 103, 104, and 105 in FIG. 1 above and information flow diagrams in FIGS. 4 and 5 below.

At 308, process 300 can combine results from the audio analysis and image frame analysis outputs at 306 in some embodiments. For example, in some embodiments, process 300 can write results from analysis server 103 and analysis server 104 to the same file and/or location in memory in some embodiments. In some embodiments, process 300 can use any suitable amount of data and/or metadata which is contained in the analysis output from analysis servers 103, 104, and 105 in some embodiments. In some embodiments, process 300 can combine any other suitable information with the results from 306. For example, at 308, process 300 can include a textual description from the metadata of the video and/or any other suitable metadata with the analysis results in some embodiments.

In some embodiments, process 300 can additionally format analysis results from any and/or all of analysis server 103, 104, and 105 at 308 for use as input to a multimodal machine learning model. For example, in some embodiments, process 300 can perform tokenization and word embedding on ASR transcripts at 308. In another example, in some embodiments, process 300 can perform tokenization and word embedding on ORC transcripts at 308. In another example, in some embodiments, process 300 can perform tokenization and term-frequency inverse-document-frequency (TDIF) weighting on textual description(s) of the video at 308. In another example, in some embodiments, process 300 can submit predictions from the image classifier analysis to a 1-dimensional convolutional layer at 308.

At 310, process 300 can determine a probability that the video contains content from a plurality of categories using the combined and/or formatted analysis results in some embodiments. In some embodiments, process 300 can use the combined and formatted analysis results from 308 in any suitable manner at 310. In some embodiments, process 300 can input the combined and formatted analysis results to a trained neural network at 310.

For example, as described above, a multimodal neural network can receive multiple inputs such as at least one of transcripts or text information from an optical character recognition model that detects text appearing within image frames of the video, transcripts or text information from an automated speech recognition model that detects speech spoken in an audio portion of the video, text based image descriptions generated by social media users, a list of probabilities generated by a pretrained image classifier that images within the image frames of the video fall within particular image classes, a list of audio tags, and/or a list of objects detected in the image frames of the video. In continuing this example, the neural network can process OCR transcripts using tokenization and word embedding. Additionally, in some embodiments, the neural network can process ASR transcripts using tokenization and word embedding. Additionally, in some embodiments, the neural network can process any other suitable text using tokenization and term-frequency inverse-document-frequency weighting. For example, video descriptions can be processed by tokenization and term-frequency inverse-document-frequency (TFIDF) weighting, where the TFIDF values can then be submitted to a fully connected layer. In some embodiments, the neural network can process image classifier predictions in a one-dimensional convolutional layer. For example, image classifier predictions can be padded to a standard length, and then submitted to a one-dimensional convolutional layer. Across all image predictions, the multimodal neural network can then select the maximum value of each dimension of the convolutional output.

In continuing this example, the classification head of the multimodal neural network begins by concatenating the final outputs of the ASR, OCR, description, and image classifier components. The output of this concatenation can then be successively processed by several alternating dropout and fully connected layers. A final fully connected classification layer can then compute the probability of the input video containing each binary Global Alliance for Responsible Media category or GARM category.

In some embodiments, process 300 can train a neural network with a set of training data labeled with categories from the plurality of categories. In some embodiments, at 310, process 300 can run a trained neural network with alternating dropout and fully connected layers. In some embodiments, the neural network can include a fully connected classification layer at 310.

In some embodiments, at 310, the trained neural network can output a probability for each category in the plurality of categories. For example, in some embodiments, at 310, process 300 can output a set of eleven numbers [0.28, 0.01, 0.05, 0.00, 0.00, 0.33, 0.66, 0.70, 0.10, 0.05, 0.13] where each number corresponds to the probability that a video (e.g., social media post) is classified in the corresponding eleven categories set by the Global Alliance for Responsible Media in a framework for responsible brand safety (listed below):

1. Adult and Explicit Sexual Content
2. Arms and Ammunition
3. Crime and Harmful Acts to Individuals and Society
4. Death and Injury
5. Online Piracy
6. Hate Speech and Acts of Aggression
7. Obscenity and Profanity
8. Illegal Drugs, Tobacco, eCigarettes, Vaping, and Alcohol 9. Spam or Harmful Content
10. Terrorism
11. Debated Sensitive Social Issues In some embodiments, at 312, process 300 can determine a threshold probability for each category in the plurality of categories in some embodiments. In some embodiments, process 300 can determine a threshold probability using any suitable mechanism. In some embodiments, process 300 can use a subset of training data which was reserved from training the neural network at 310 ("holdout data"). In some embodiments, process 300 can use a machine learning model, statistical model (e.g., F-score), and/or any suitable mathematical function to determine threshold probabilities. In some embodiments, process 300 can determine a different threshold for each category in the plurality of categories at 312.

At 314, process 300 can, for each category, compare the probabilities determined at 310 to the thresholds determined at 312 in some embodiments. In some embodiments, process 300 can assign a positive binary indicator to a probability that is equal to or above the threshold value (e.g., "yes" or "1"). Similarly, in some embodiments, process 300 can assign a negative binary indicator (e.g., "no" or "0") to a probability that is less than the threshold value.

At 316, process 300 can associate any category with a positive indicator from 314 with the video in some embodiments. In some embodiments, process 300 can associate any number of categories from the plurality of categories with the video in some embodiments. In some embodiments, process 300 can associate the categories to the video in any suitable manner. For example, process 300 can add the positive indicated categories to the metadata of the video in some embodiments.

For example, an advertiser can receive categories associated with a positive indicator to determine whether a particular video meets safety requirements. In continuing this example, the advertiser can determine whether to place an advertisement in connection with the video (e.g., a pre-roll advertisement, a mid-roll advertisement, or a post-roll advertisement).

In another example, an advertiser can receive categories associated with a positive indicator to determine how many advertisements have been placed with a video that is deemed to be unsafe or otherwise unsuitable for a brand associated with the advertiser.

Figure 4:
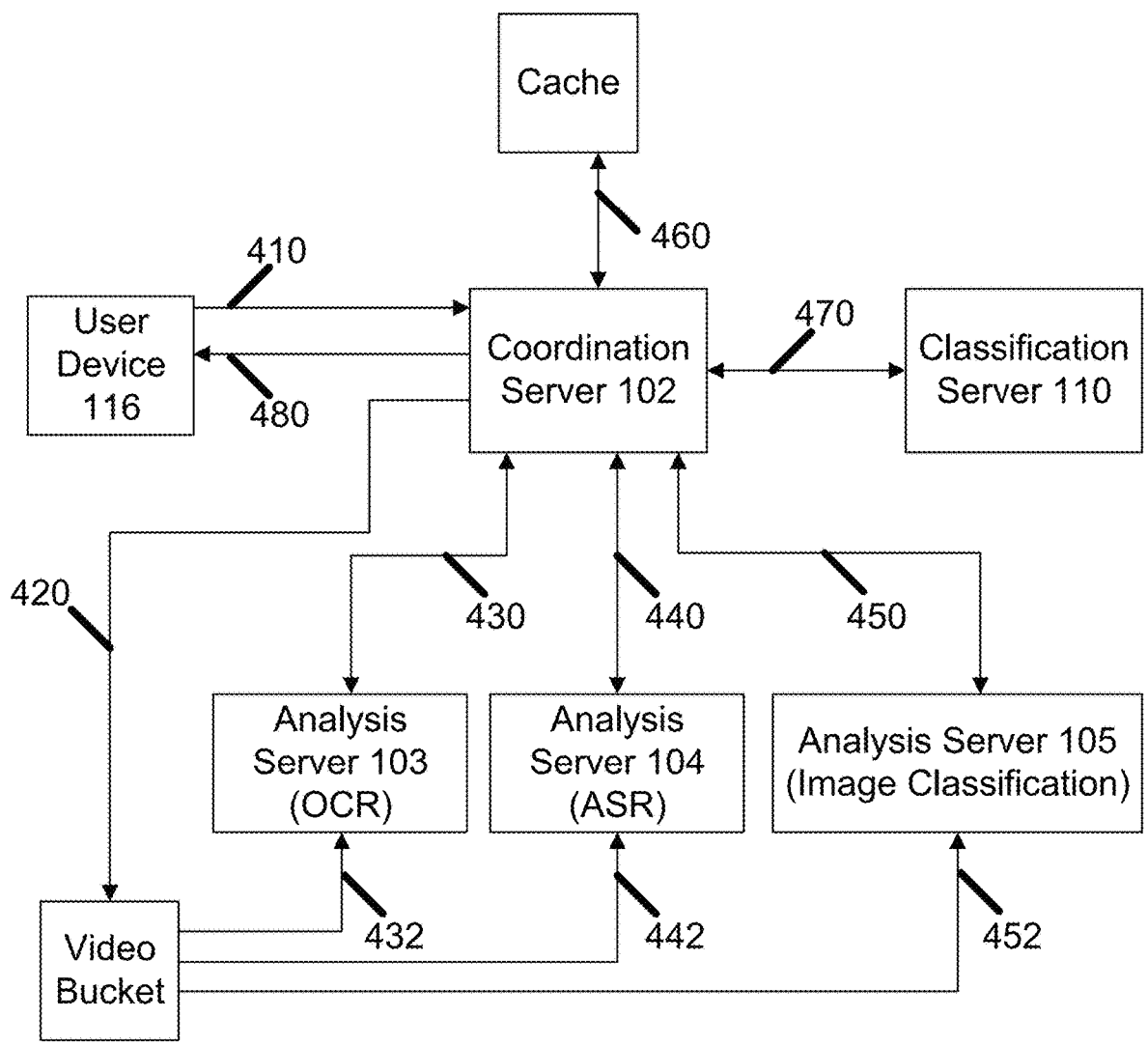
FIG. 4 shows an example of an information flow diagram for generating video classifications in accordance with some embodiments of the disclosed subject matter.

Turning to FIG. 4, an example 400 of an information flow diagram for generating video classifications in accordance with some embodiments is shown. In some embodiments, portions of information flow diagram 400 can be implemented on coordination server 102, analysis servers 103, 104, and 105, classification server 108, and user device 116.

At 410, user device 116 can transmit a request to coordination server 102 for analysis of one or more videos in some embodiments. The request can be in any suitable format in some embodiments. For example, as shown in FIGS. 4 and 5, the request can include a video identifier and/or file location in some embodiments. In some embodiments, coordination server 102 can use the video identifier, file location, or any other form of request to retrieve the video indicated by the request from user device 116. It should be noted that user device 116 can be, for example, a server associated with a social media website that requests a classification of a video. In a more particular example, user device 116 can correspond with a server that receives uploaded video content items and transmits the video content items to coordination server 102 or any other server for obtaining a classification as to whether an advertisement should be associated with one or more of the video content items (e.g., safe for advertising or unsafe for advertising). In another more particular example, user device 116 can correspond with an advertising device that transmits a video identifier to coordination server 102 for obtaining a classification as to whether the advertising device should proceed with placing an advertisement in connection with the video corresponding to the video identifier (e.g., placing a bid, selecting an advertisement for placement with the video, etc.).

At 420, coordination server 102 can send components of the video to a temporary storage location (e.g., a video storage bucket) in some embodiments. In some embodiments, as shown in FIGS. 4 and 5, coordination server 102 can transmit an audio portion and multiple image frames sampled or otherwise extracted from a video to a video bucket, as described above in connection with process 300 in FIG. 3.

At 430, 440, and 450, coordination server 102 can alert analysis servers 103, 104, and 105 in some embodiments. Note that only three analysis servers are shown in diagram 400, however, any suitable number of analysis servers can be implemented in some embodiments. In some embodiments, coordination server 102 can send a video id, synchronization key, temporary storage location, and/or any other suitable instructions to analysis servers 103, 104, and 105.

In some embodiments, analysis server 103 can run a machine learning model trained in OCR as described above in connection with FIG. 1. In some embodiments, analysis server 103 can retrieve the series of images from temporary storage at 432. In some embodiments, analysis server 103 can analyze the series of images as described above in connection with process 300 in FIG. 3. In some embodiments, analysis server 103 can send a return message to coordination server 102 at 430. For example, analysis server 103 can send a message including the video id, a synchronization key, and/or text file with OCR transcript to coordination server 102 at 430 in some embodiments.

In some embodiments, analysis server 104 can run a machine learning model trained in ASR as described above in connection with FIG. 1. In some embodiments, analysis server 104 can retrieve the audio track from temporary storage at 442. In some embodiments, analysis server 104 can analyze audio track to produce a transcript as described above in connection with process 300 in FIG. 3. In some embodiments, analysis server 104 can send a return message to coordination server 102 at 440. For example, analysis server 104 can send a message including the video id, a synchronization key, and/or text file with an ASR transcript to coordination server 102 at 440 in some embodiments.

In some embodiments, analysis server 105 can run a machine learning model trained in image classification as described above in connection with FIG. 1. In some embodiments, analysis server 105 can retrieve the series of images from temporary storage at 452. In some embodiments, analysis server 105 can analyze the series of images as described above in connection with process 300 in FIG. 3. In some embodiments, analysis server 105 can send a return message to coordination server 105 at 450. For example, analysis server 105 can send a message including the video id, a synchronization key, and/or text file with analysis results to coordination server 102 at 450 in some embodiments.

In some embodiments, coordination server 102 can store return messages from analysis servers 103, 104, and 105 in a temporary cache at 460. In some embodiments, coordination server 102 can receive return messages from analysis servers 103, 104, and 105 at any suitable time and in any suitable order in some embodiments.

In some embodiments, at 470, coordination server 102 can notify classification server 108. In some embodiments, coordination server 102 can send the plurality of analysis results from return messages to classification server 108 at 470 in any suitable format.

In some embodiments, classification server 108 can run and/or train a multimodal machine learning model with inputs received at 470 as described above in connection with FIGS. 1 and 3.

In some embodiments, at 470, classification server 108 can send a return message to coordination server 102. In some embodiments, at 470, classification server 108 can send the binary classification outputs from the multimodal classification model as described above in connection with FIG. 3.

In some embodiments, coordination server 102 can use the return message from 470 to associate classification outputs from the classification server 108 with the video. In some embodiments, at 480, coordination server 102 can return a report of classification results for the video to user device 116.

In some embodiments, at least some of the above described blocks of the processes of FIGS. 3-5 can be executed or performed in any order or sequence not limited to the order and sequence shown in and described in connection with the figures. Also, some of the above blocks of FIGS. 3-5 can be executed or performed substantially simultaneously where appropriate or in parallel to reduce latency and processing times. Additionally or alternatively, some of the above described blocks of the processes of FIGS. 3-5 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating video classifications using multimodal video analysis are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for classifying videos, the method comprising:
   receiving, from a computing device, a video identifier;
   parsing a video associated with the video identifier into an audio portion and a plurality of image frames;
   analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class;
   concurrently with analyzing the plurality of image frames associated with the video, analyzing the audio portion of the video using an automated speech recognition technique to obtain second textual information corresponding to words spoken in the video;
   combining the first textual information, the probability of each of the plurality of objects appearing in the at least one of the plurality of frames of the video, and the second textual information to obtain a combined analysis output for the video;
   determining, using a neural network, a safety score for each of a plurality of categories that the video contains content belonging to a category of the plurality of categories, wherein the combined analysis output is input into the neural network; and
   in response to receiving the video identifier, transmitting a plurality of safety scores corresponding to the plurality of categories to the computing device for the video associated with the video identifier.

2. The method of claim 1, further comprising:
   determining a threshold for each category in the plurality of categories; and
   comparing, for each of the plurality of categories, the safety score that the video contains content belonging to the category of the plurality of categories against the threshold for that category.

3. The method of claim 2, further comprising:
   associating categories with the video based on the comparison of the safety score and the threshold for each of the plurality of safety categories; and
   transmitting the associated categories to the computing device for the video associated with the video identifier.

4. The method of claim 2, wherein the threshold for each category in the plurality of categories is determined based on a set labeled data that is applied to the neural network.

5. The method of claim 1, further comprising determining whether one or more advertisements associated with the computing device should be placed in connection with the video associated with the video identifier based on the safety score for each of the plurality of categories.

6. The method of claim 1, further comprising determining a number of advertisements served in connection with a plurality of videos that are deemed to be unsafe based on the safety score for each of the plurality of categories corresponding to that video.

7. The method of claim 1, wherein the plurality of categories includes categories that are considered unsafe in association with one or more advertisements by an advertiser.

8. The method of claim 1, wherein the video is generated by a user on a social media platform.

9. The method of claim 1, wherein the audio portion of the video is further analyzed using an audio tagging classifier to detect sounds occurring within the audio portion of the video and wherein the detected sounds are incorporated into the combined analysis output for the video.

10. The method of claim 1, wherein the plurality of images frames are further analyzed using an object detector to detect objects appearing in at least one of the plurality of images and wherein the detected objects are incorporated into the combined analysis output for the video.

11. A system for classifying videos, the system comprising:
a server that includes a hardware processor, wherein the hardware processor is configured to:
receive, from a computing device, a video identifier;
parse a video associated with the video identifier into an audio portion and a plurality of image frames;
analyze the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class;
concurrently with analyzing the plurality of image frames associated with the video, analyze the audio portion of the video using an automated speech recognition technique to obtain second textual information corresponding to words spoken in the video;
combine the first textual information, the probability of each of the plurality of objects appearing in the at least one of the plurality of frames of the video, and the second textual information to obtain a combined analysis output for the video;
determine, using a neural network, a safety score for each of a plurality of categories that the video contains content belonging to a category of the plurality of categories, wherein the combined analysis output is input into the neural network; and
in response to receiving the video identifier, transmit a plurality of safety scores corresponding to the plurality of categories to the computing device for the video associated with the video identifier.

12. The system of claim 11, wherein the hardware processor is further configured to:
determine a threshold for each category in the plurality of categories;
compare, for each of the plurality of categories, the safety score that the video contains content belonging to the category of the plurality of categories against the threshold for that category.

13. The system of claim 12, wherein the hardware processor is further configured to:
associate categories with the video based on the comparison of the safety score and the threshold for each of the plurality of safety categories; and
transmit the associated categories to the computing device for the video associated with the video identifier.

14. The system of claim 12, wherein the threshold for each category in the plurality of categories is determined based on a set labeled data that is applied to the neural network.

15. The system of claim 11, wherein the hardware processor is further configured to determine whether one or more advertisements associated with the computing device should be placed in connection with the video associated with the video identifier based on the safety score for each of the plurality of categories.

16. The system of claim 11, wherein the hardware processor is further configured to determine a number of advertisements served in connection with a plurality of videos that are deemed to be unsafe based on the safety score for each of the plurality of categories corresponding to that video.

17. The system of claim 11, wherein the plurality of categories includes categories that are considered unsafe in association with one or more advertisements by an advertiser.

18. The system of claim 11, wherein the video is generated by a user on a social media platform.

19. The system of claim 11, wherein the audio portion of the video is further analyzed using an audio tagging classifier to detect sounds occurring within the audio portion of the video and wherein the detected sounds are incorporated into the combined analysis output for the video.

20. The system of claim 11, wherein the plurality of images frames are further analyzed using an object detector to detect objects appearing in at least one of the plurality of images and wherein the detected objects are incorporated into the combined analysis output for the video.

21. A non-transitory computer-readable medium containing computer executable instructions that, when executed by a processor, cause the processor to perform a method for classifying videos, the method comprising:
receiving, from a computing device, a video identifier;
parsing a video associated with the video identifier into an audio portion and a plurality of image frames;
analyzing the plurality of images frames associated with the video using (i) an optical character recognition technique to obtain first textual information corresponding to text appearing in at least one of the plurality of image frames and (ii) an image classifier to obtain, for each of a plurality of objects appearing in at least one of the plurality of frames of the video, a probability that an object appearing in at least one of the plurality of images falls within an image class;
concurrently with analyzing the plurality of image frames associated with the video, analyzing the audio portion of the video using an automated speech recognition technique to obtain second textual information corresponding to words spoken in the video;
combining the first textual information, the probability of each of the plurality of objects appearing in the at least one of the plurality of frames of the video, and the second textual information to obtain a combined analysis output for the video;
determining, using a neural network, a safety score for each of a plurality of categories that the video contains content belonging to a category of the plurality of categories, wherein the combined analysis output is input into the neural network; and
in response to receiving the video identifier, transmitting a plurality of safety scores corresponding to the plurality of categories to the computing device for the video associated with the video identifier.

* * * * *